United States Patent
Ozaki et al.

(10) Patent No.: US 12,134,223 B2
(45) Date of Patent: Nov. 5, 2024

(54) MOLDING DEVICE AND MOLDING METHOD

(71) Applicant: MITSUBISHI HEAVY INDUSTRIES, LTD., Tokyo (JP)

(72) Inventors: Ryota Ozaki, Tokyo (JP); Yuki Kani, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 23 days.

(21) Appl. No.: 17/634,861

(22) PCT Filed: Nov. 11, 2019

(86) PCT No.: PCT/JP2019/044150
§ 371 (c)(1),
(2) Date: Feb. 11, 2022

(87) PCT Pub. No.: WO2021/095097
PCT Pub. Date: May 20, 2021

(65) Prior Publication Data
US 2022/0324156 A1    Oct. 13, 2022

(51) Int. Cl.
*B29C 53/04* (2006.01)
*B29C 53/42* (2006.01)
*B29C 53/82* (2006.01)

(52) U.S. Cl.
CPC ............ *B29C 53/42* (2013.01); *B29C 53/043* (2013.01); *B29C 53/82* (2013.01)

(58) Field of Classification Search
CPC ....... B29C 53/42; B29C 53/043; B29C 53/82; B29C 55/20
See application file for complete search history.

(56) References Cited

U.S. PATENT DOCUMENTS 5,115,661 A * 5/1992 McGowan ............ B21D 25/02
72/20.2
10,166,729 B2   1/2019 Weimer et al.
(Continued)

FOREIGN PATENT DOCUMENTS

GB          784997 A      10/1957
JP        46006345 B1      2/1971
(Continued)

OTHER PUBLICATIONS

Extended European Search Report of European Application No. 19952278.0 mailed Jul. 1, 2022; 7pp.
(Continued)

*Primary Examiner* — Thu Khanh T. Nguyen
(74) *Attorney, Agent, or Firm* — HAUPTMAN HAM, LLP

(57) ABSTRACT

A molding device is includes a mandrel that has an arc-shaped cross section; a roller that has a round-shaped cross section, is movable along a surface of the mandrel, and applies a pressing force to a material to be molded placed on the mandrel; a gripping unit that grips the material to be molded on an outside of the roller with respect to the mandrel and applies a tensile force to the material to be molded; a roller driving unit that moves the roller along the surface of the mandrel; a gripping-unit driving unit that moves the gripping unit. A control unit synchronizes a position of the roller and a position of the gripping unit with each other to control the roller driving unit and the gripping-unit driving unit so that the material to be molded is arranged in a direction perpendicular to a vertical direction of the mandrel.

2 Claims, 6 Drawing Sheets

(56) References Cited

U.S. PATENT DOCUMENTS

2006/0267246 A1* 11/2006 Bibeau ................. B29C 51/262
                                                          264/291
2016/0176173 A1    6/2016 Kubota et al.

FOREIGN PATENT DOCUMENTS

| JP | 63068226   A | 3/1988  |
|----|--------------|---------|
| JP | 01139236   A | 5/1989  |
| JP | 01147227   U | 10/1989 |
| JP | 2016120605 A | 7/2016  |

OTHER PUBLICATIONS

International Search Report and Written Opinion of PCT/JP2019/044150 mailed Jan. 28, 2020; 12pp.

* cited by examiner

MOLDING DEVICE AND MOLDING METHOD

RELATED APPLICATIONS

The present application is a National Phase of International Application No. PCT/JP2019/044150 filed Nov. 11, 2019.

TECHNICAL FIELD

The present disclosure relates to a forming device and a forming method, and in particular, to a forming device and forming method for shaping a reinforced fiber sheet which is a material of a composite material.

BACKGROUND ART

There is a case where a composite material, such as carbon fiber reinforced plastics (CFRP), is used as a material for a fuselage structure of an aircraft. When the CFRP is formed to form a formed article, reinforced fiber sheets such as prepregs are laminated. In a case where the formed article has a curved surface shape (a contour shape) such as a fuselage skin of an aircraft, there is a method of forming the curved surface shape by bending (shaping) a laminate laminated to be flat.

As shown in FIG. 9A and FIG. 9B, when a laminate 20 in which reinforced fiber sheets are laminated is bent, internal stress due to viscous resistance occurs between the reinforced fiber sheets. Therefore, as shown in FIG. 9B, it is necessary to release the internal stress to cause an interlayer slip to appropriately occur, and cause the reinforced fiber sheets to be disposed in a state of being shifted in a predetermined shift amount after deformation. In order to improve an interlayer slip property, the viscosity of a synthetic resin configuring the laminate is reduced by heating it after shaping.

PTL 1 below discloses a technique for cooling a preform of a heated carbon fiber thermoplastic resin while compacting it with a roller.

CITATION LIST

Patent Literature

[PTL 1] U.S. Pat. No. 10,166,729

SUMMARY OF INVENTION

Technical Problem

In a case of forming a large structure such as a fuselage skin, when shaping a laminate laminated to be flat, it is necessary to cause an interlayer slip to occur over the entire surface of each reinforced fiber sheet. In this case, since a region where the interlayer slip occurs is very wide, interlayer viscous resistance occurring when bending the laminate becomes very large. As a result, since each reinforced fiber sheet does not shift in an appropriate shift amount, wrinkles or the like easily occur, so that there is a concern that quality deterioration may occur. In the related art, in order to prevent the occurrence of wrinkles or the like, it is necessary to perform shaping over a long period of time, and therefore, there is a problem in that productivity is lowered and costs are high.

The present disclosure has been made in view of such circumstances, and has an object to provide a forming device and a forming method, in which it is possible to efficiently shape a reinforced fiber sheet and cause an interlayer slip to appropriately occur.

Solution to Problem

In order to solve the above problems, a forming device and a forming method of the present disclosure adopt the following means.

That is, a forming device according to the present disclosure includes: a mandrel having an arc-shaped cross section; a roller that has a circular cross section, is movable along a surface of the mandrel, and applies a pressing force to a material to be formed placed on the mandrel; a gripping unit that grips the material to be formed on an outer side than the roller with respect to the mandrel and applies a tensile force to the material to be formed; a roller drive unit that moves the roller along the surface of the mandrel; a gripping unit drive unit that moves the gripping unit; and a control unit that controls the roller drive unit and the gripping unit drive unit to cause a position of the roller and a position of the gripping unit to be synchronized with each other such that the material to be formed between the roller and the gripping unit is disposed in a direction perpendicular to a vertical direction of the mandrel.

A forming method according to the present disclosure is a forming method using a forming device that includes a mandrel having an arc-shaped cross section, a roller that has a circular cross section, is movable along a surface of the mandrel, and applies a pressing force to a material to be formed placed on the mandrel, a gripping unit that grips the material to be formed on an outer side than the roller with respect to the mandrel and applies a tensile force to the material to be formed, a roller drive unit that moves the roller along the surface of the mandrel, and a gripping unit drive unit that moves the gripping unit, the forming method including: a step of causing the roller to apply a pressing force to the material to be formed placed on the mandrel; a step of causing the gripping unit to apply a tensile force to the material to be formed; a step of moving the roller along the surface of the mandrel; a step of moving the gripping unit; and a step of causing a position of the roller and a position of the gripping unit to be synchronized with each other such that the material to be formed between the roller and the gripping unit is disposed in a direction perpendicular to a vertical direction of the mandrel.

Advantageous Effects of Invention

According to the present disclosure, it is possible to efficiently shape a reinforced fiber sheet and cause an interlayer slip to appropriately occur.

DESCRIPTION OF EMBODIMENTS

Hereinafter, an embodiment according to the present disclosure will be described with reference to the drawings.

A forming device 1 according to the present embodiment is used when forming a composite material, for example, carbon fiber reinforced plastic (CFRP), and is particularly applied to a step of bending (shaping) a plurality of laminated reinforced fiber sheets. The reinforced fiber sheet is an example of a material to be formed according to the present disclosure. The reinforced fiber sheet is, for example, a prepreg, a dry fiber, or the like. The forming device 1 according to the present disclosure can be applied to both a case of forming carbon fiber reinforced plastic (CFRP) formed article using a thermosetting resin and a case of forming the CFRP formed article using a thermoplastic resin.

Figure 1:
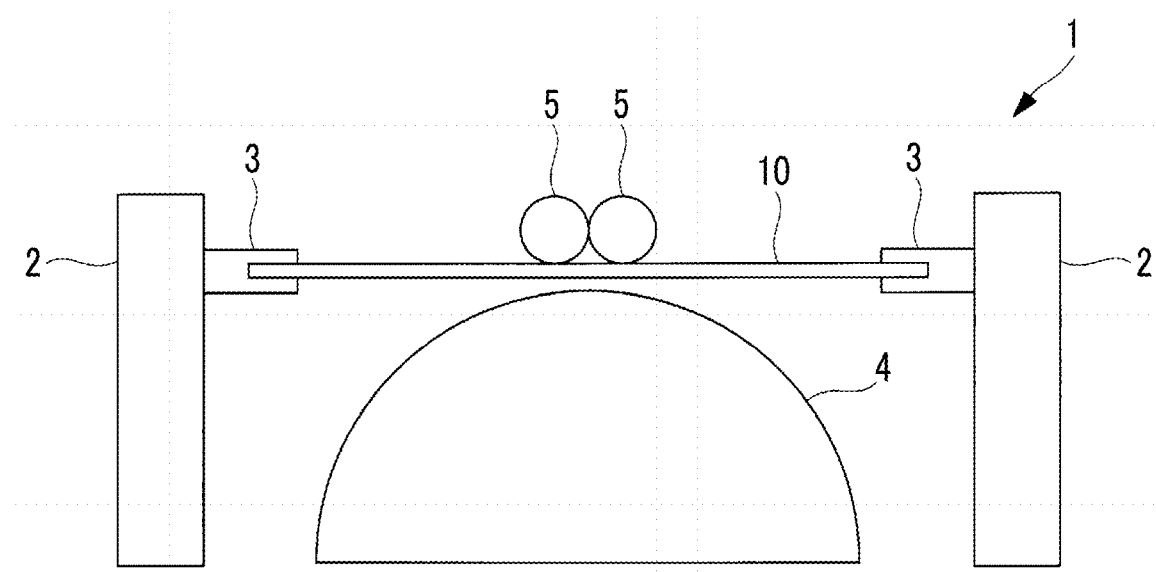
FIG. 1 is a front view showing a forming device according to an embodiment of the present disclosure, and shows a state before shaping.
Figure 2:
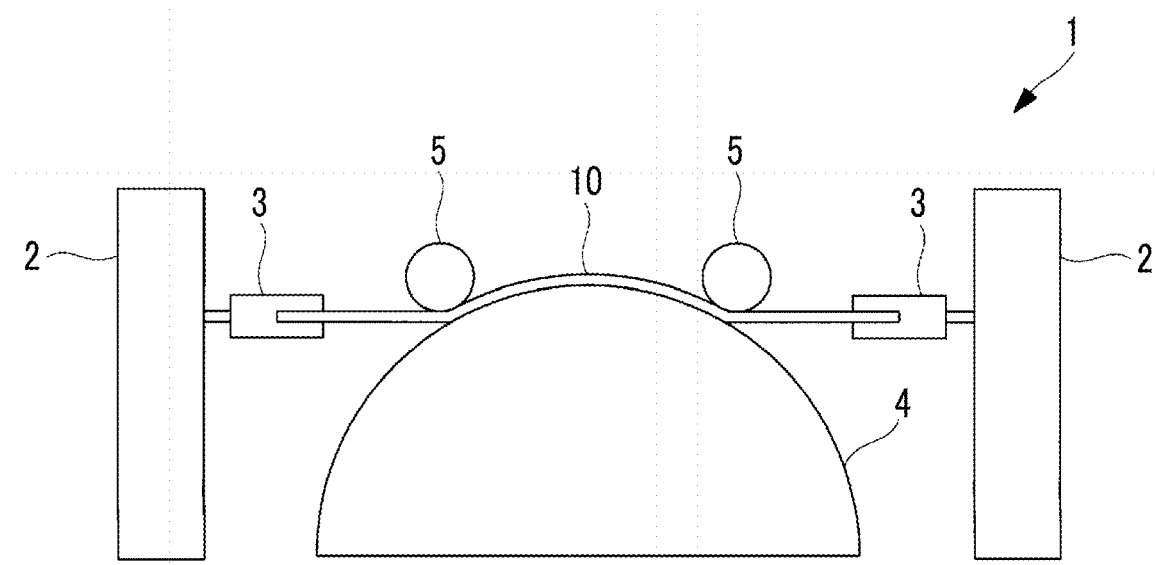
FIG. 2 is a front view showing the forming device according to the embodiment of the present disclosure, and shows a state during the shaping.
Figure 3:
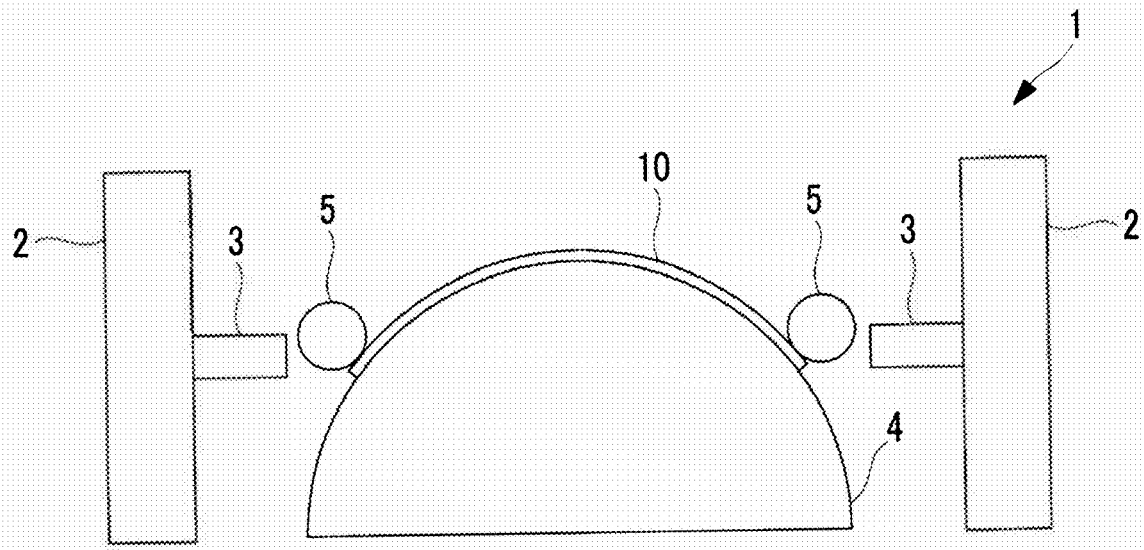
FIG. 3 is a front view showing the forming device according to the embodiment of the present disclosure, and shows a state after the shaping.
Figure 5:
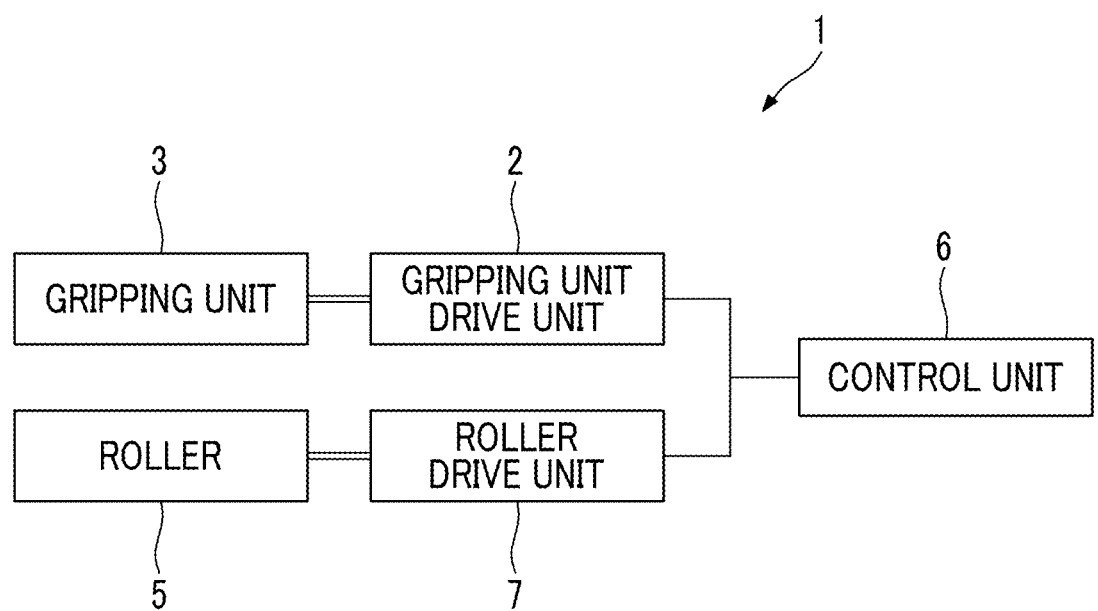
FIG. 5 is a block diagram showing the forming device according to the embodiment of the present disclosure.

As shown in FIGS. 1 to 3, the forming device 1 includes a gripping unit drive unit 2, a gripping unit 3, a mandrel 4, a roller 5, and the like. Further, as shown in FIG. 5, the forming device 1 further includes a control unit 6 and a roller drive unit 7.

As shown in FIGS. 1 to 3, the mandrel 4 has an arc-shaped cross section, and a reinforced fiber sheet 10 such as a prepreg is placed on the arc-shaped surface. The reinforced fiber sheet 10 is an example of a material to be formed. The reinforced fiber sheet 10 is pressed by the roller 5 on the mandrel 4 to be shaped into a shape along the arc-shaped surface of the mandrel 4.

The roller 5 has a circular cross section and can move while rolling along the surface of the mandrel 4. The roller 5 applies a pressing force to the reinforced fiber sheet 10 placed on the mandrel 4. A total of two rollers 5 are installed one on each side of the right and left with a vertical line (a center line) passing through the center of the circle of the mandrel 4 as the center.

The gripping unit 3 grips the reinforced fiber sheet 10 on the outer side than the roller 5 with respect to the mandrel 4. Further, the gripping unit 3 applies a tensile force to the reinforced fiber sheet 10. A total of two gripping units 3 are installed one on each side of the right and left with the vertical line (the center line) of the mandrel 4 as the center. As will be described later, two or more rollers 5 and two or more gripping units 3 may be installed as long as the position of the roller 5 and the position of the gripping unit 3 can be synchronized with each other. The gripping unit 3 applies a tensile force to the reinforced fiber sheet 10 between the roller 5 and the gripping unit 3 before shaping is performed along the mandrel 4. In this way, since the material to be formed is reliably disposed along the roller 5, the difference in the peripheral length of the reinforced fiber sheet 10 that is in contact with the roller 5 becomes zero regardless of the difference in the position of the roller 5 due to the movement of the roller 5.

The roller drive unit 7 has a configuration in which it moves the roller 5 along the surface of the mandrel 4. The roller drive unit 7 adjusts the position of the roller 5, based on a drive signal that is received from the control unit 6.

The gripping unit drive unit 2 moves the gripping unit 3 in the direction parallel to the vertical line of the mandrel 4, that is, in an up-down direction. The gripping unit drive unit 2 adjusts the position of the gripping unit 3, based on a drive signal that is received from the control unit 6. The gripping unit drive units 2 are provided one for each gripping unit 3.

The control unit 6 controls the roller drive unit 7 and the gripping unit drive unit 2 to cause the position of the roller 5 and the position of the gripping unit 3 to be synchronized with each other such that the reinforced fiber sheet 10 between the roller 5 and the gripping unit 3 is disposed in the direction perpendicular to the vertical direction of the mandrel 4, that is, in the horizontal direction. The control unit 6 generates a drive signal regarding the movement of the roller 5 and transmits the drive signal to the roller drive unit 7. Further, the control unit 6 generates a drive signal regarding the movement of the gripping unit 3 and transmits the drive signal to the gripping unit drive unit 2.

Next, the operation of the forming device 1 according to the present embodiment will be described.

First, as shown in FIG. 1, the reinforced fiber sheet 10 is gripped by the gripping units 3 so as to be disposed in the horizontal direction. Then, the gripping unit drive units 2 move the gripping units 3 downward to dispose the reinforced fiber sheet 10 on the mandrel 4. At this time, the gripping units 3 apply a tensile force to the reinforced fiber sheet 10.

Then, as shown in FIG. 2, the roller drive unit 7 moves the roller 5 along the surface of the mandrel 4 from the center of the mandrel 4 toward the outside. At this time, the roller 5 applies a pressing force to the reinforced fiber sheet 10. In this way, the reinforced fiber sheet 10 is gradually bent downward from the uppermost end of the mandrel 4 to be shaped into a shape along the shape of the mandrel 4. When the shaping by the roller 5 is started, that is, at the uppermost end of the mandrel 4, the shaping may be performed by using only one roller 5 instead of two rollers. In a case of forming a CFRP formed article using a thermoplastic resin, in the pressing by the roller 5, the reinforced fiber sheet 10 may be cooled while the reinforced fiber sheet 10 is bent.

When the shaping by the roller 5 is completed up to the end portion of the reinforced fiber sheet 10, as shown in FIG. 3, the gripping of the reinforced fiber sheet 10 by the gripping unit 3 is released. Then, the roller 5 deforms the end portion of the reinforced fiber sheet 10 along the mandrel 4.

At the time of the shaping described above, the position of the roller 5 and the position of the gripping unit 3 are adjusted in synchronization with each other such that the reinforced fiber sheet 10 between the roller 5 and the gripping unit 3 is always in the horizontal direction.

Figure 4A:
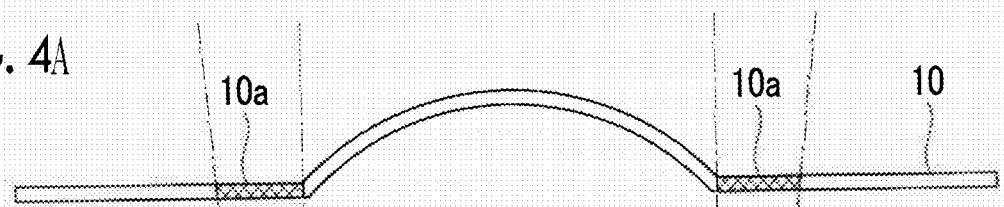
FIG. 4A and FIG. 4B are transverse sectional views showing a shaped reinforced fiber sheet, and shows a portion where a local interlayer slip occurs.
Figure 4B:
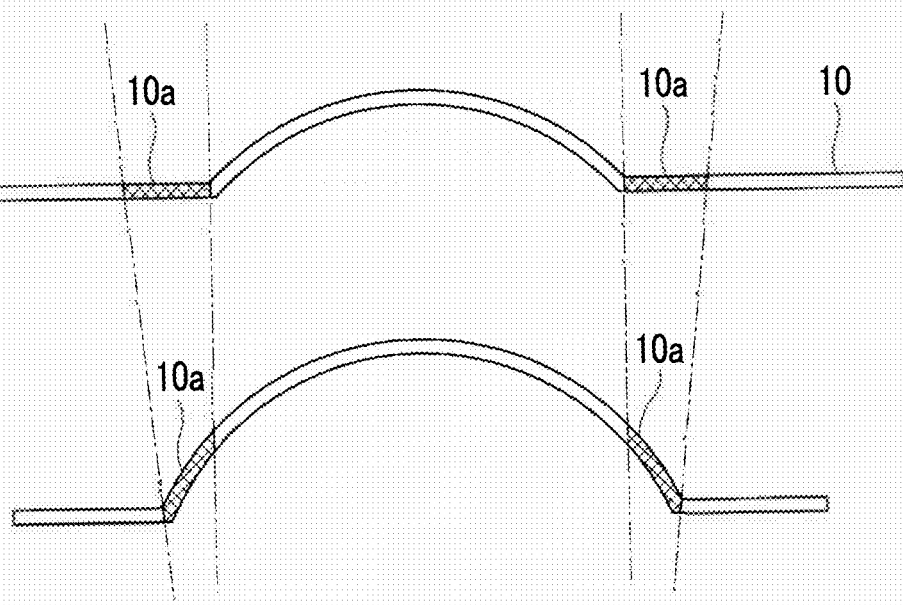

In a case where the reinforced fiber sheet 10 is shaped by the above method, as shown in FIG. 4A and FIG. 4B, a region where an interlayer slip occurs at a certain minute time interval $\Delta T$ is, for example, only a region 10a in FIG. 4A and FIG. 4B. FIG. 4A and FIG. 4B show that the region 10a at time $t=T_1$ shown in FIG. 4A is shaped on the mandrel 4 at time $t=T_1+\Delta T$ shown in FIG. 4B. Therefore, the region where an interlayer slip occurs at a certain minute time interval $\Delta T$ is suppressed so as to be local.

Figure 6:
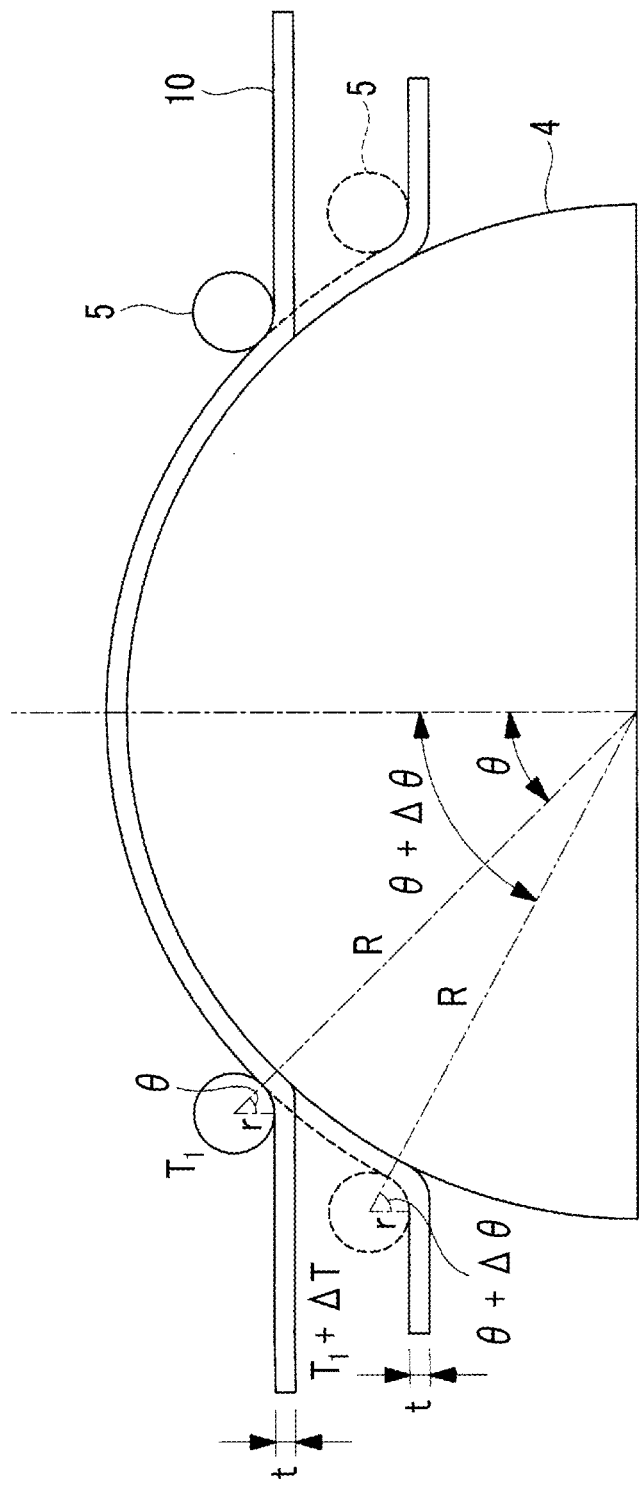
FIG. 6 is an explanatory diagram showing the forming device according to the embodiment of the present disclosure and a shaped reinforced fiber sheet.
Figure 7:
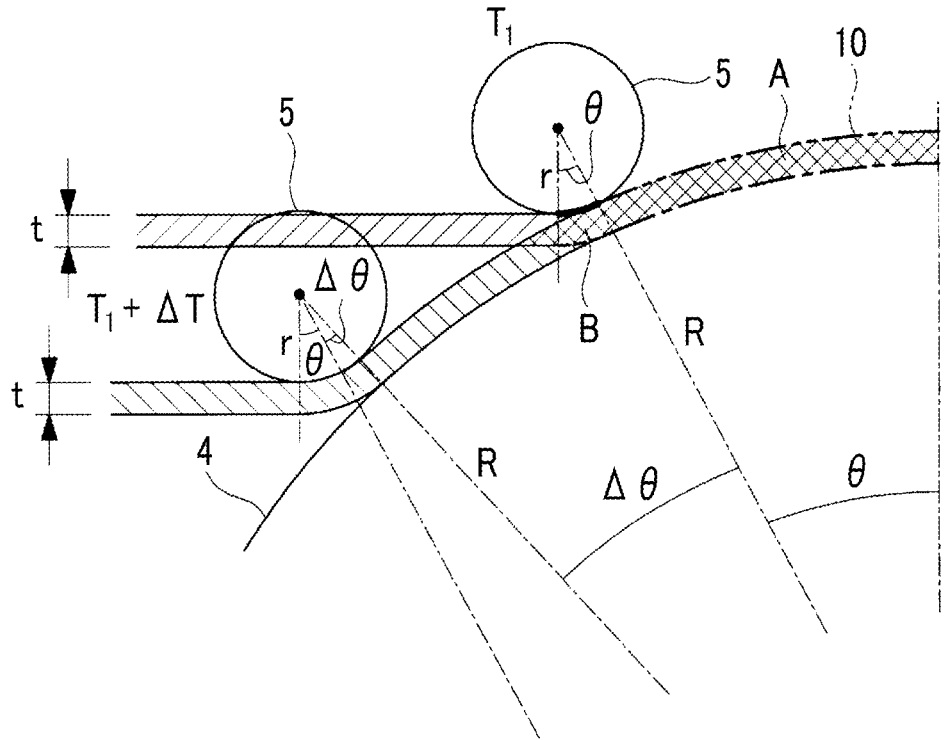
FIG. 7 is a partially enlarged view of FIG. 6.
Figure 8:
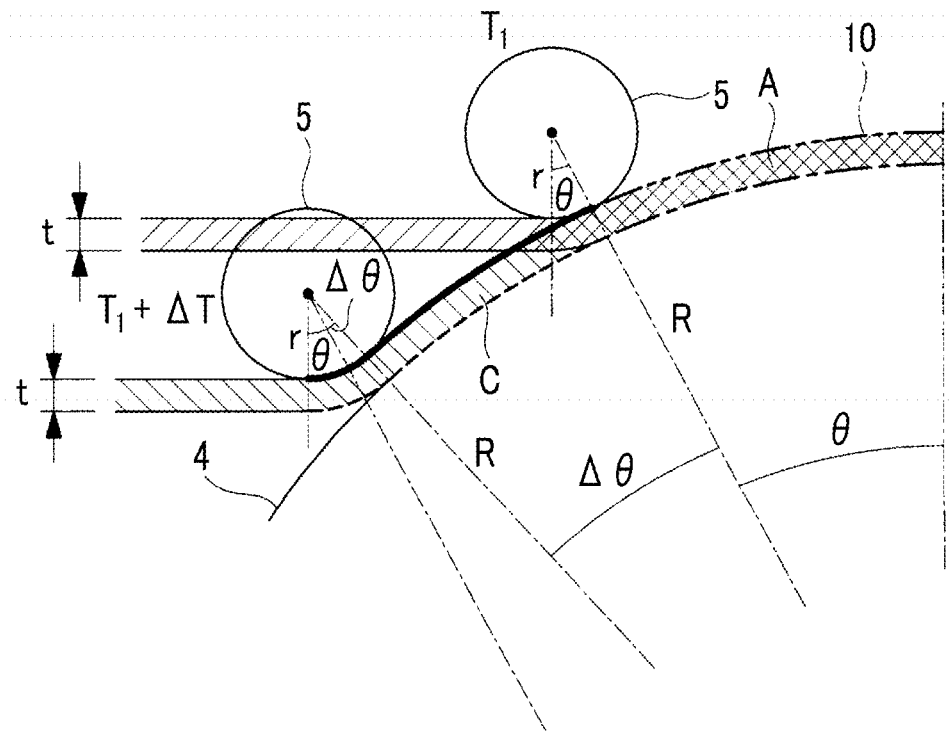
FIG. 8 is a partially enlarged view of FIG. 6.
Figure 9A:
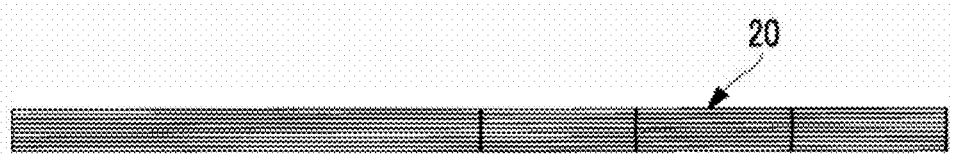
FIG. 9A and FIG. 9B are transverse sectional views showing a reinforced fiber sheet before shaping FIG. 9A and after shaping FIG. 9B by a forming method of the related art.
Figure 9A:
Figure 9B:
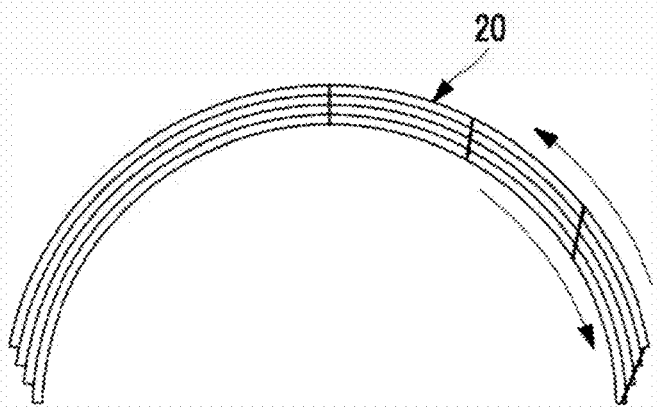

Hereinafter, with reference to FIGS. 6 to 8, it will be described in detail that the interlayer slip occurs in a local region. FIGS. 7 and 8 are partially enlarged views of FIG. 6.

Since the position of the roller 5 and the position of the gripping unit 3 are adjusted, so that the reinforced fiber sheet 10 between the roller 5 and the gripping unit 3 is disposed in the direction perpendicular to the vertical direction of the mandrel 4, that is, in the horizontal direction, the difference in the peripheral length of the reinforced fiber sheet 10 shaped along the mandrel 4 in the period from the start of the shaping to a certain time $T_1$ is equal to the difference in the peripheral length of the reinforced fiber sheet 10 disposed along the roller 5 at the certain time $T_1$.

Here, the difference in the peripheral length of the reinforced fiber sheet 10 in the mandrel 4 is the difference between the length (a one-dot chain line portion of a region A in FIG. 7) on the mandrel 4 side (the inner surface side) of the reinforced fiber sheet 10 that is in contact with the mandrel 4 in the period from the start of the shaping to the certain time $T_1$ and the length (a two-dot chain line portion of the region A in FIG. 7) on the side (the outer surface side) opposite to the mandrel 4 of the reinforced fiber sheet 10. The difference in the peripheral length of the reinforced fiber sheet 10 in the mandrel 4 occurs due to the diameter of the mandrel 4 and a plate thickness t of the reinforced fiber sheet 10, and is expressed by Expression 1 below. Here, R is the radius of the mandrel 4, and θ is an angle that is formed by the vertical line of the mandrel 4 at time $T_1$ and the line connecting the center of the mandrel 4 and the center of the roller 5.

[Expression 1]

$$\pi(R+t)\frac{\theta}{180} - \pi R\frac{\theta}{180} = \pi t\frac{\theta}{180} \quad (1)$$

Further, the difference in the peripheral length of the reinforced fiber sheet 10 in the roller 5 is the difference between the length (a thick solid line portion of a region B in FIG. 7) on the roller 5 side (the inner surface side) of the reinforced fiber sheet 10 that is in contact with the roller 5 at the certain time $T_1$ and the length (a broken line portion of the region B in FIG. 7) on the side (the outer surface side) opposite to the roller 5 of the reinforced fiber sheet 10. The difference in the peripheral length of the reinforced fiber sheet 10 in the roller 5 occurs due to the diameter of the roller 5 and the plate thickness t of the reinforced fiber sheet 10, and is expressed by Expression 2 below. Here, r is the radius of the roller 5.

[Expression 2]

$$\pi(r+t)\frac{\theta}{180} - \pi r\frac{\theta}{180} = \pi t\frac{\theta}{180} \quad (2)$$

That is, the difference in a peripheral length (Expression 1) occurring in the reinforced fiber sheet 10 (the region A in FIG. 7) shaped along the mandrel 4 is canceled by the difference in a peripheral length occurring in the reinforced fiber sheet 10 (the region B in FIG. 7) disposed along the roller 5, and therefore, at the certain time $T_1$, the difference in the peripheral length of the entire reinforced fiber sheet 10 becomes zero and is offset.

Further, the difference in the peripheral length of the reinforced fiber sheet 10 (the region A in FIG. 8) shaped along the mandrel 4 in the period from the start of the shaping to the certain time $T_1$ is equal to the difference in a peripheral length occurring in the reinforced fiber sheet 10 (a region C in FIG. 8) at the certain minute time interval ΔT during the shaping.

Here, the difference in the peripheral length of the reinforced fiber sheet 10 shaped along the mandrel 4 is the difference between the length (a one-dot chain line portion of the region A in FIG. 8) on the mandrel 4 side (the inner surface side) of the reinforced fiber sheet 10 that is in contact with the mandrel 4 in the period from the start of the shaping to the certain time $T_1$ and the length (a two-dot chain line portion of the region A in FIG. 8) of the side (the outer surface side) opposite to the mandrel 4 of the reinforced fiber sheet 10.

The difference in the peripheral length of the already shaped reinforced fiber sheet 10 (the region A in FIG. 8) is expressed by Expressed 1 described above.

Further, the difference in a peripheral length occurring in the reinforced fiber sheet 10 (the region C in FIG. 8) at the certain minute time interval ΔT during the shaping is the difference between the length (a thick solid line portion of the region C in FIG. 8) of the roller 5 side (the inner surface side) of the reinforced fiber sheet 10 with which the roller 5 comes into contact at the certain minute time interval ΔT and the length (a broken line portion of the region C in FIG. 8) on the side (the outer surface side) opposite to the roller 5 of the reinforced fiber sheet 10.

The difference in a peripheral length (the region C in FIG. 8) occurring at the certain minute time interval ΔT during the shaping is expressed by Expression 3 below. Here, Δθ is the amount of change of an angle that is formed by the vertical line of the mandrel 4 and the line connecting the center of the mandrel 4 and the center of the roller 5 in the minute time interval ΔT.

[Expression 3]

$$\left\{\pi R\frac{\Delta\theta}{180} + \pi(r+t)\frac{\theta+\Delta\theta}{180}\right\} - \left\{\pi(R+t)\frac{\Delta\theta}{180} + \pi r\frac{\theta+\Delta\theta}{180}\right\} = \pi t\frac{\theta}{180} \quad (3)$$

That is, since the difference in the peripheral length of the already shaped reinforced fiber sheet 10 is equal to the difference in the peripheral length of the reinforced fiber sheet 10 that is shaped at the certain minute time interval ΔT, a difference between the differences in peripheral length becomes zero (is offset).

As described above, (1) the difference in the peripheral length of the entire reinforced fiber sheet 10 is offset at the certain time $T_1$. (2) The difference in the peripheral length of the reinforced fiber sheet 10 (the region A in FIG. 8) already shaped until the certain time $T_1$ is equal to and offset by the difference in the peripheral length of the reinforced fiber sheet 10 that is shaped at the certain minute time interval ΔT. Therefore, an interlayer slip occurs only in the reinforced fiber sheet 10 that is shaped at the certain minute time interval ΔT. On the other hand, an interlayer slip does not occur in the unshaped reinforced fiber sheet 10 that will be shaped from now on. Therefore, an interlayer slip occurring when a time changes from the certain time $T_1$ to the time $T_1+\Delta T$ occurs in a local region through which the roller 5 has passed.

As described above, according to the present embodiment, even in a case of forming a large structure such as a fuselage skin, since an interlayer slip locally occurs unlike a method of the related art in which an interlayer slip occurs over the entire surface of a reinforced fiber sheet, the occurrence of wrinkles or the like can be prevented or reduced, and thus the risk of quality deterioration can be reduced. Further, since it is not necessary to perform the shaping over a long period of time, the shaping can be performed efficiently.

The forming device described in the embodiment described above is grasped as follows, for example.

The forming device (1) according to the present disclosure includes a mandrel (4) having an arc-shaped cross section, a roller (5) that has a circular cross section, is movable along a surface of the mandrel, and applies a pressing force to a material to be formed (10) placed on the mandrel, a gripping unit (3) that grips the material to be formed on an outer side than the roller with respect to the mandrel and applies a tensile force to the material to be formed, a roller drive unit (7) that moves the roller along the surface of the mandrel, a gripping unit drive unit (2) that moves the gripping unit, and a control unit (6) that controls the roller drive unit and the gripping unit drive unit to cause a position of the roller and a position of the gripping unit to be synchronized with each other such that the material to be formed between the roller and the gripping unit is disposed in a direction perpendicular to a vertical direction of the mandrel.

According to this configuration, the material to be formed is shaped by the mandrel and the roller while being pulled by the gripping unit. The roller moves along the surface of the mandrel, and the gripping unit moves in synchronization with the roller. At this time, the roller drive unit and the gripping unit drive unit are controlled, so that the position of the roller and the position of the gripping unit are adjusted such that the material to be formed between the roller and the gripping unit is disposed in the direction perpendicular to the vertical direction of the mandrel.

In this manner, the position of the roller and the position of the gripping unit are adjusted, so that the material to be formed between the roller and the gripping unit is disposed in the direction perpendicular to the vertical direction of the mandrel, that is, in the horizontal direction. Therefore, the difference in the peripheral length of the material to be formed shaped along the mandrel in the period from the start of the shaping to the certain time $T_1$ is equal to the difference in the peripheral length of the material to be formed disposed along the roller at the certain time $T_1$. Here, the difference in the peripheral length of the material to be formed in the mandrel is the difference between the length on the mandrel side (the inner surface side) of the material to be formed that is in contact with the mandrel and the length on the side (the outer surface side) opposite to the mandrel of the material to be formed. Further, the difference in the peripheral length of the material to be formed in the roller is the difference between the length on the roller side (the inner surface side) of the material to be formed that is in contact with the roller and the length on the side (the outer surface side) opposite to the roller of the material to be formed. That is, the difference in a peripheral length occurring in the material to be formed shaped along the mandrel is canceled by the difference in a peripheral length occurring in the material to be formed disposed along the roller, and therefore, the difference in the peripheral length of the entire material to be formed becomes zero at the certain time $T_1$.

Further, the difference in the peripheral length of the material to be formed that has been already shaped is equal to the difference in the peripheral length occurring in the material to be formed in a certain minute time interval. That is, a difference between the differences in peripheral length becomes zero between the material to be formed that has been already shaped and the material to be formed that is shaped at a certain minute time interval. Therefore, the interlayer slip occurs only in the material to be formed that is shaped at a certain minute time interval, and the interlayer slip does not occur in the unshaped material to be formed that will be shaped from now on.

In the forming device according to the present disclosure, it is preferable that the gripping unit applies a tensile force to the material to be formed between the roller and the gripping unit before being shaped along the mandrel.

According to this configuration, the material to be formed is reliably disposed along the roller, so that the difference in the peripheral length of the material to be formed that is in contact with the roller becomes zero regardless of the difference in the position of the roller due to the movement of the roller.

In the forming device according to the present disclosure, it is preferable that the difference in the peripheral length of the material to be formed shaped along the mandrel in the period from the start of the shaping to a certain time is equal to the difference in the peripheral length of the material to be formed disposed along the roller at the certain time.

According to this configuration, the difference in a peripheral length occurring in the material to be formed shaped along the mandrel is canceled by the difference in a peripheral length occurring in the material to be formed disposed along the roller, and therefore, the difference in the peripheral length of the entire material to be formed becomes zero at the certain time $T_1$.

In the forming device according to the present disclosure, it is preferable that the difference in the peripheral length of the material to be formed shaped along the mandrel in the period from the start of shaping to a certain time is equal to the difference in a peripheral length occurring in the material to be formed at a certain minute time interval during the shaping.

According to this configuration, a difference between the differences in peripheral length becomes zero between the material to be formed that has been already shaped and the material to be formed that is shaped at a certain minute time interval. Therefore, the interlayer slip occurs only in the material to be formed that is shaped at a certain minute time interval, and the interlayer slip does not occur in the unshaped material to be formed that will be shaped from now on.

The forming method according to the present disclosure is a forming method using a forming device that includes a mandrel having an arc-shaped cross section, a roller that has a circular cross section, is movable along a surface of the mandrel, and applies a pressing force to a material to be formed placed on the mandrel, a gripping unit that grips the material to be formed on an outer side than the roller with respect to the mandrel and applies a tensile force to the material to be formed, a roller drive unit that moves the roller along the surface of the mandrel, and a gripping unit drive unit that moves the gripping unit, the forming method including a step of causing the roller to apply a pressing force to the material to be formed placed on the mandrel, a step of causing the gripping unit to apply a tensile force to the material to be formed, a step of moving the roller along the surface of the mandrel, a step of moving the gripping unit, and a step of causing a position of the roller and a position of the gripping unit to be synchronized with each other such that the material to be formed between the roller and the gripping unit to be disposed in a direction perpendicular to a vertical direction of the mandrel.

The invention claimed is:

1. A forming method using a forming device that includes a mandrel having an arc-shaped cross section, a roller that has a circular cross section, is movable along a surface of the mandrel, and applies a pressing force to a material to be formed being a composite material placed on the mandrel, a gripping unit that grips the material to be formed on an outer side than the roller with respect to the mandrel and applies a tensile force to the material to be formed, a roller drive unit that moves the roller along the surface of the mandrel, and a gripping unit drive unit that moves the gripping unit, the forming method comprising:

a step of causing the roller to apply a pressing force to the material to be formed placed on the mandrel;

a step of causing the gripping unit to apply a tensile force to the material to be formed;

a step of moving the roller along the surface of the mandrel;

a step of moving the gripping unit;

a step of causing a position of the roller and a position of the gripping unit to be synchronized with each other such that the material to be formed between the roller and the gripping unit is disposed in a direction perpendicular to a vertical direction of the mandrel; and a step of causing an interlayer slip to occur over the material to be formed, acted on by the forming device, at a certain minute time interval ΔT, wherein, in the step of causing the interlayer slip, a difference in a peripheral length of the material to be formed shaped along the mandrel in a period from a start of shaping to a certain time T1 is expressed by Expression (1) below:

$$\pi(R+t)\frac{\theta}{180} - \pi R\frac{\theta}{180} = \pi t\frac{\theta}{180} \quad (1)$$

a difference in a peripheral length of the material to be formed disposed along the roller at the certain time T1 is expressed by Expression (2) below:

$$\pi(r+t)\frac{\theta}{180} - \pi r\frac{\theta}{180} = \pi t\frac{\theta}{180} \quad (2)$$

and at the certain minute time interval ΔT during the shaping, a difference in a peripheral length of the material to be formed that occurs due to a balance between a difference in a peripheral length of the material to be formed shaped along the mandrel and a difference in a peripheral length of the material to be formed disposed along the roller is expressed by Expression (3) below:

$$\left\{\pi R\frac{\Delta\theta}{180} + \pi(r+t)\frac{\theta+\Delta\theta}{180}\right\} - \left\{\pi(R+t)\frac{\Delta\theta}{180} + \pi r\frac{\theta+\Delta\theta}{180}\right\} = \pi t\frac{\theta}{180} \quad (3)$$

where R is a radius of the mandrel, r is a radius of the roller, t is a plate thickness of the material to be formed, θ is an angle that is formed by a vertical line of the mandrel and a line connecting a center of the mandrel with a center of the roller at the certain time T1, and Δθ is an amount of change of an angle that is formed by the vertical line of the mandrel and the line connecting the center of the mandrel with the center of the roller in the certain minute time interval ΔT.

2. The forming method using the forming device according to claim 1, further comprising a step of causing an interlayer slip to occur over a surface of a reinforced fiber sheet, acted on by the forming device, at a predetermined time internal.

* * * * *